United States Patent
Oliveira et al.

(10) Patent No.: US 12,461,791 B2
(45) Date of Patent: Nov. 4, 2025

(54) GENERATION OF CLOUD-BASED ACTIONABLE PROCESSES

(71) Applicant: Hewlett Packard Enterprise Development LP, Houston, TX (US)

(72) Inventors: Francisco Javier Ortiz Oliveira, Madrid (ES); Maria Arcones Viana, Madrid (ES); Ignacio Aldama Perez, Alcobendas (ES)

(73) Assignee: Hewlett Packard Enterprise Development LP, Spring, TX (US)

( * ) Notice: Subject to any disclaimer, the term of this patent is extended or adjusted under 35 U.S.C. 154(b) by 826 days.

(21) Appl. No.: 17/562,291

(22) Filed: Dec. 27, 2021

(65) Prior Publication Data

US 2023/0205564 A1   Jun. 29, 2023

(51) Int. Cl.
G06F 9/50     (2006.01)
G06F 9/455    (2018.01)
G06F 9/54     (2006.01)
H04L 41/08    (2022.01)

(52) U.S. Cl.
CPC ........ *G06F 9/5072* (2013.01); *G06F 9/45558* (2013.01); *G06F 9/547* (2013.01); *H04L 41/08* (2013.01); *H04L 41/0886* (2013.01)

(58) Field of Classification Search
None
See application file for complete search history.

(56) References Cited

U.S. PATENT DOCUMENTS

| | | | |
|---|---|---|---|
| 8,776,180 B2 | 7/2014 | Kumar et al. | |
| 9,590,872 B1 * | 3/2017 | Jagtap | H04L 41/0886 |
| 9,621,435 B2 | 4/2017 | Vasudevan et al. | |
| 10,033,833 B2 | 7/2018 | Fu et al. | |
| 10,470,739 B2 | 11/2019 | Raman et al. | |
| 2019/0243836 A1 | 8/2019 | Nanda et al. | |
| 2020/0295984 A1 | 9/2020 | Qian et al. | |

FOREIGN PATENT DOCUMENTS

| | | |
|---|---|---|
| EP | 3399417 A1 | 11/2018 |
| WO | 2019157399 A1 | 8/2019 |
| WO | 2020231952 A1 | 11/2020 |
| WO | 2020263765 A1 | 12/2020 |

* cited by examiner

*Primary Examiner* — Qing Yuan Wu
(74) *Attorney, Agent, or Firm* — Slater Matsil, LLP (57) ABSTRACT

Generation of cloud-based actionable processes is described. An example includes receiving a request for an application to be executed in a cloud environment, the application including an application specific function to be executed from an orchestrator in the cloud environment, the application specific function being in addition to a default function that is available from the orchestrator; defining the application specific function as a cloud-based actionable process based at least in part on a package declarative manifest; and exposing the defined application specific function in one or more of a graphical user interface (GUI) or an application program interface (API).

17 Claims, 8 Drawing Sheets

GENERATION OF CLOUD-BASED ACTIONABLE PROCESSES

BACKGROUND

Cloud-based applications may be implemented utilizing virtualization. In operation, cloud-based applications may also involve certain operations and processes to function, which may be provided as, for example, IaaS (Infrastructure as a Service) operations. In some cases, certain IaaS operations may be provided to each cloud-based application.

BRIEF DESCRIPTION OF THE DRAWINGS

Examples described here are illustrated by way of example, and not by way of limitation, in the figures of the accompanying drawings in which like reference numerals refer to similar elements.

DETAILED DESCRIPTION

Examples described herein are directed to generation of cloud-based actionable processes.

In cloud-based applications (referring to applications in which some or all of the processing logic and data storage is provided in the cloud), operations may be implemented utilizing virtualization, such as operations in conjunction with an orchestrator to support virtual machine operation. One aspect of virtualization is providing operations and processes that are to be utilized in such cloud-based applications.

In some instances, virtualization may provide the same or similar certain operations and processes to each cloud application independently of the individual workload or the application type. Hyperscalers and private clouds may provide the basic IaaS (Infrastructure as a Service) operations such as create, shutdown, snapshot the full disk, and other general functions, which may be available to each cloud-based application.

Cloud-based applications may also use certain application specific functions, such as, for example, a license function (such as to apply licenses for the application), a backup function (such as to backup only data and not configuration, or other specific backup operations), an upgrade function (such as to provide and in service upgrade), or other such functions that relate specifically to the cloud-based application. In some examples, such application specific functions are specific because they may relate to one or more cloud-based applications but not to other cloud-based applications. However, the implementation of such application specific functions can involve significant coding effort to enable the functions for each application, particularly when a large number of users are operating in a particular cloud environment. Although such functions may be exposed in a variety of APIs, commands, etc., this exposure may not completely or satisfactorily assist with the implementation of the operations when there are many applications, each one with different procedures, different APIs, different credentials, and other factors that are specific to the relevant application.

To address the foregoing challenges, examples described herein relate to a process for, upon receiving a request in a cloud-based environment for a function that is specific to a certain application (referred to as an application specific function), defining a cloud-based process to perform the application specific function. The process (referred to herein as a cloud-based actionable process) is defined utilizing a manifest that defines support for functions that are enabled for specific applications, and is made available for operation through APIs (Application Programming Interfaces), GUIs (Graphical User Interfaces, also referred to as UIs (User Interfaces)), or both. Cloud-based actionable processes are made available in addition to any other functions (referred to herein as default functions) that are made available to all applications in the cloud-based environment, the cloud-based actionable processes allowing for support of additional operations that are used in certain applications without implementing extensive programming to make such operations available.

Figure 1:
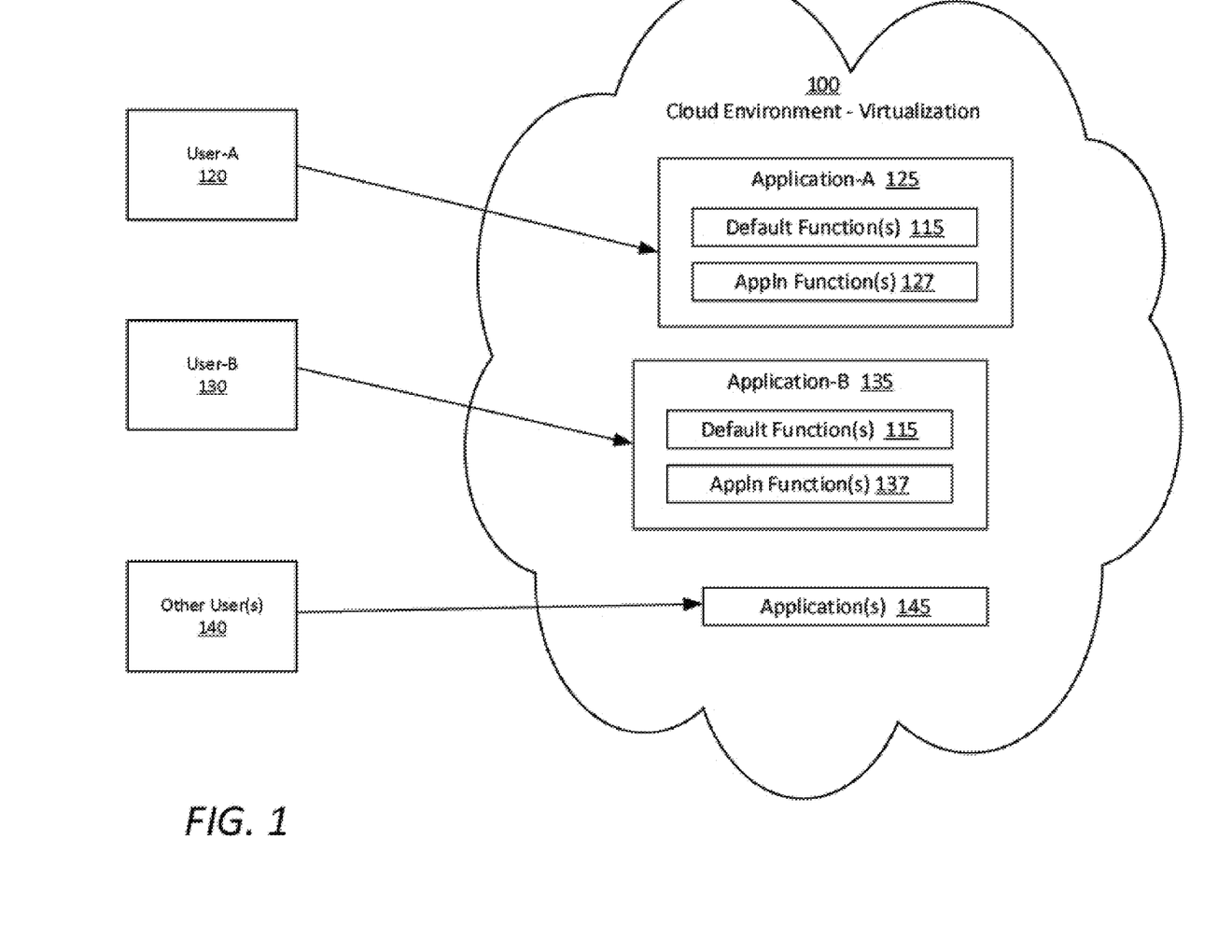
FIG. 1 is an illustration of an example of implementation of cloud-based actionable processes.

FIG. 1 is an illustration of an example of implementation of cloud-based actionable processes. As illustrated in FIG. 1, in a particular cloud environment 100 multiple applications may be virtualized, such that the functions may be implemented and processed in the cloud. The cloud environment 100 may include an NFV (Network Functions Virtualization) environment providing virtualization of network services. For example, Application-A 125 may be supported for a particular User-A 120 and Application-B 135 may be supported for User-B 130, and there may be one or more other applications 145 supported for one or more other users 140.

In this example, a cloud-based system may provide each of the applications with all or a part of a set of default functions, such as one or more default functions 115 (which may, for example, be selected as appropriate for a particular cloud application) being available and provided for Application-A 125 and Application-B 135. However, implementing the applications 125, 135, and 145 may involve virtualizing one or more application specific functions in the cloud environment and exposing (i.e., making available) the one or more application specific functions for use in conjunction with the application. Virtualizing these functions for individual applications can be very costly in terms of programming and support. Examples are illustrated as one or more application specific functions 127 for Application-A 125 and one or more application specific functions 137 for Application-B 135.

In an example, such application specific functions are to be implemented as generated cloud-based actionable processes according to specified operations, parameters, and conditions for each such function, with such functions further to be exposed for access by APIs, GUIs, or both.

Figure 2:
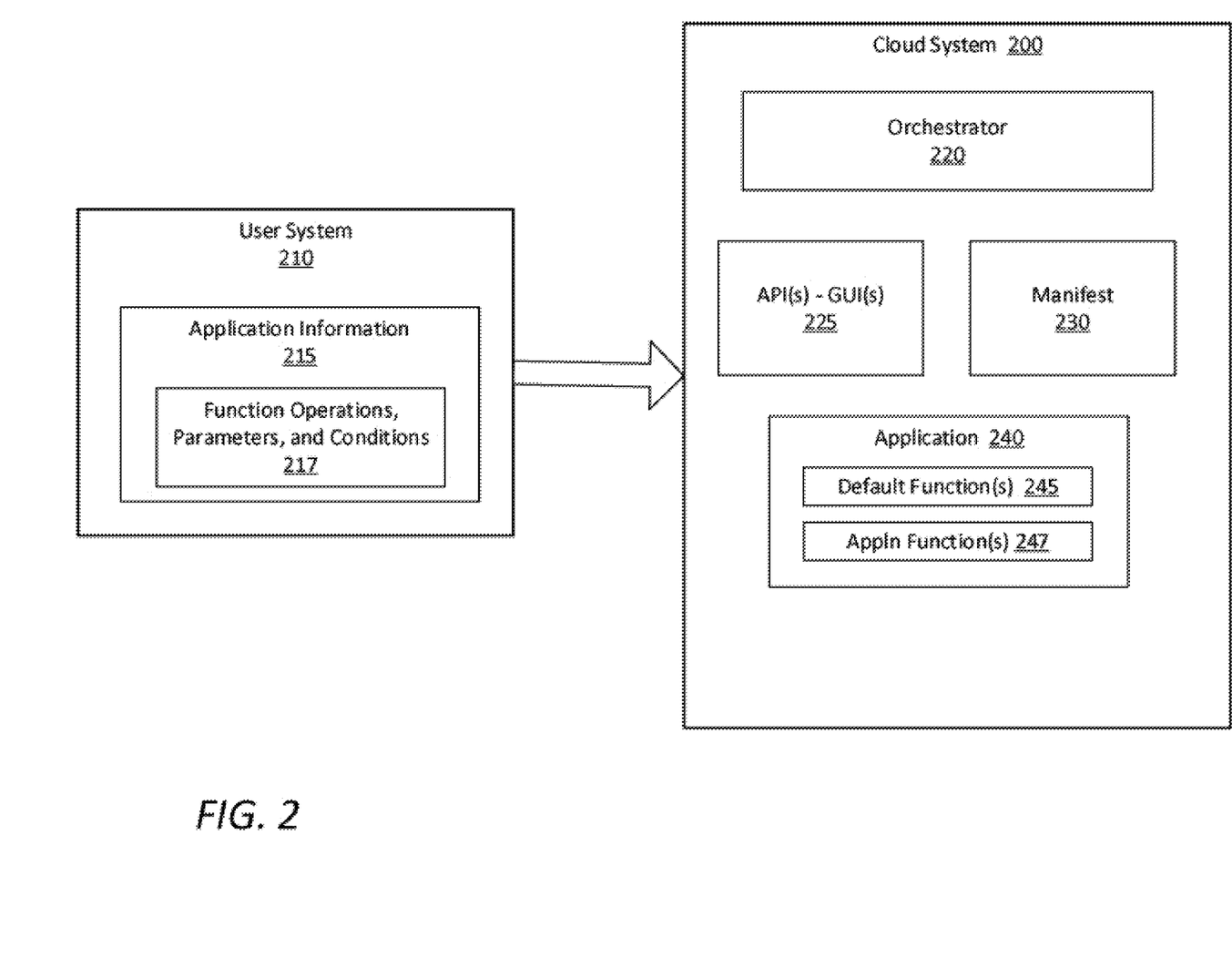
FIG. 2 is an illustration of an example of a cloud system to support cloud-based actionable processes.

FIG. 2 is an illustration of an example of a cloud system to support cloud-based actionable processes. As illustrated, a cloud system 200 (which may also be referred to as a cloud server provider or similar terms), which may include one or more computing systems such as a server, may include an orchestrator 220 (also referred to as a cloud orchestrator) to manage connections and operations of workloads processed by the cloud system 200. The orchestrator generally operates to coordinate multiple tools, processes, and interfaces in the cloud system 200. The cloud system 200 includes one or more APIs and/or one or more GUIs 225 (collectively API(s) and GUI(s) 225) that may provide access to functions of applications. The API(s) and GUI(s) 225 may be generic interfaces that support both default functions and application specific functions of applications in a similar or homogenous manner.

Further, the cloud system 200 may include a package declarative manifest 230 (which may be referred to herein as the main manifest) to indicate the support provided to define application specific functions. A package generally refers to a set of code elements for an application, which may include application code and application specific functions. The package declarative manifest may include multiple manifests (which may be referred to as sub-manifests) regarding different respective aspects of the support for an application specific function. For example, the main manifest may include a process manifest indicating processes to trigger the application specific function; a condition manifest indicating conditions for operation of the application specific function; and a GUI manifest indicating a GUI for access to the application specific function.

As illustrated in FIG. 2, a user system 210 may request that a particular application with one or more application specific functions be executed by the cloud system 200. The user system 210 may provide application information 215 for the application, including any function operations, parameters, and conditions 217 for the associated application specific functions. The cloud system 200 supports the operation of the application 240, which includes one or more default functions 245 provided by the cloud system 200 and one or more application specific functions 247, wherein the support is based at least in part on the function operations, parameters, and conditions 217 and the manifest information 230.

In some embodiments, the cloud system 200 thus assists a developer in packaging certain relevant specific functions along with an application. Each of the application specific functions may have certain relevant operations, parameters, and conditions. Similar to the packaging of an application image along with certain implementation information (such as CPU (Central Processing Unit), RAM (Random Access Memory), and storage disk parameters) so that it is known that a particular image is associated with a certain minimum set of resources to be run properly, an example implementation allows for packaging certain application specific functions that can be exposed through, for example, a generic API regardless of the specific method or methods that are utilized to execute the functions.

In some examples, cloud-based actionable processes that are generated to enable application specific functions are treated in the same manner as other orchestration actions supported by the orchestrator 220, and because of this the generated cloud-based actionable processes are trackable, auditable, and secure to the same degree as other orchestration actions.

In some examples, conditions for application specific functions may be defined to restrict the availability of or displaying of the cloud-based actionable operations to certain limited circumstances. For example, a system may be allowed to backup (utilizing an application specific backup function) on a condition that there is no backup file in the last 24 hours, or may be allowed to renew a license (utilizing an application specific license renewal function) limited to a time period six months before the applicable license expires. In this manner, application specific functions may be exposed in a homogenous manner (e.g., via generic API or GUI as opposed to a specialized API or GUI) and a secure way (e.g., as controlled by conditions such as those described above) without coding into the orchestrator the definition of all actions and conditions that relate to each function.

Figure 3A:
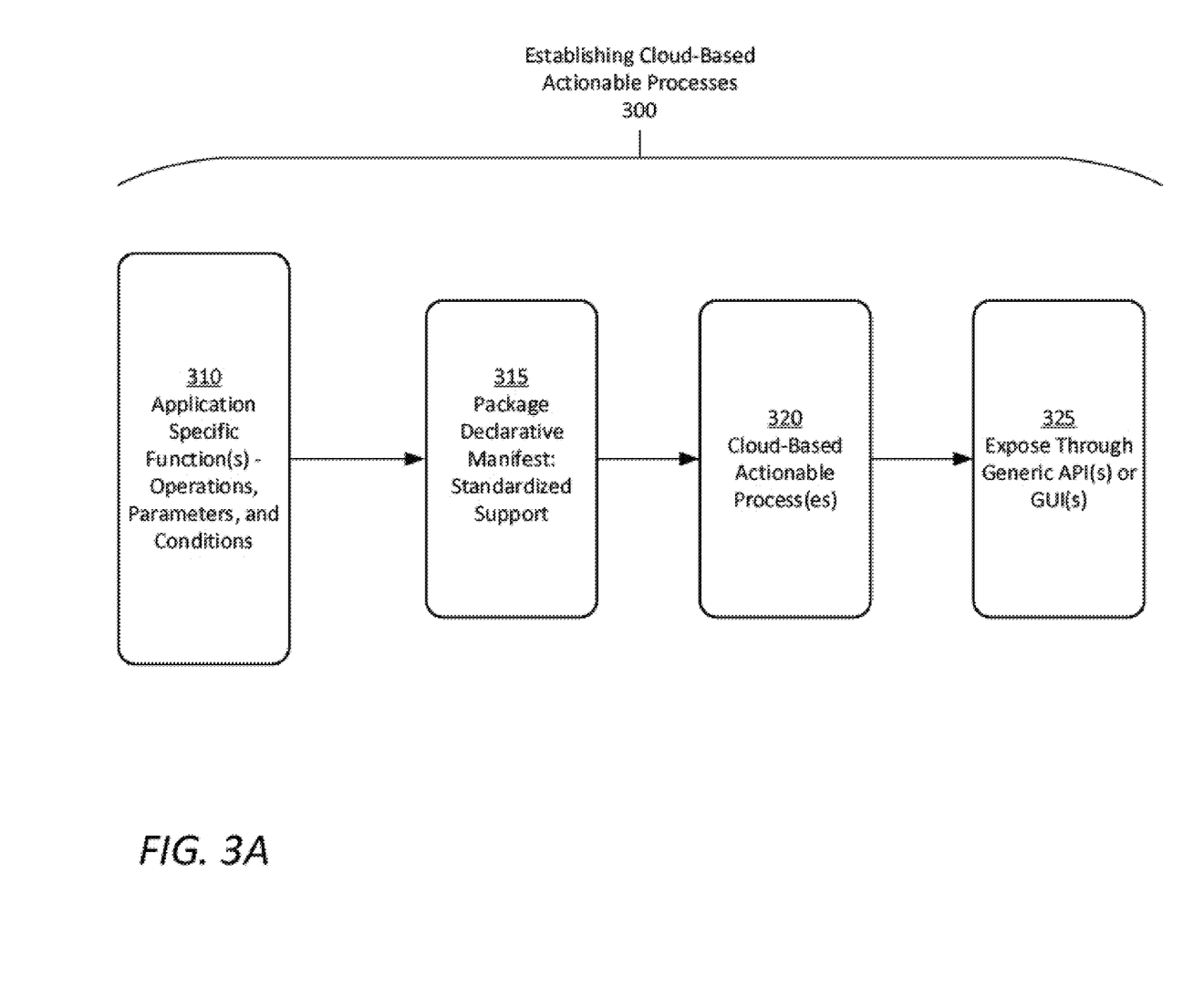
FIG. 3A illustrates an example process for establishing cloud-based actionable processes.

FIG. 3A illustrates an example of a process for establishing cloud-based actionable processes. In the illustrated process for establishing cloud-based actionable processes 300, one or more application specific functions and operations, parameters, and conditions for such functions 310 may be received, by a computer system for example, in connection with an application to be executed in a cloud environment. The operations, parameters, and conditions for a particular function may include, but are not limited to, actions to be supported for the function, conditions associated with the function (such as conditions to be met in order for the function to be performed), and visualizations associated with the function to be presented in the performance of the function.

The application specific functions and the related operations, parameters, and conditions may be implemented according to a package declarative manifest 315 that provides certain standardized support for the implementation of such functions. The application specific functions as implemented in the cloud environment may be referred to as one or more cloud-based actionable processes 320 that are virtualized in the cloud environment. Further, the one or more cloud-based actionable processes 320 may be exposed through one or more generic or common APIs or GUIs 325, allowing for the functions to implemented in a same or similar manner as default functions that are provided for each cloud-based application.

In an example, cloud-based actionable processes may be designed to allow a cloud application developer to define, along with the application specifications (CPU, RAM, storage disk, etc.), certain operations that can be executed from an orchestrator. In this manner, the user of the application may proceed without knowledge of any application specific API, credentials, or other similar factors. Further, a user can utilize one or more common APIs for every on boarded application utilizing the cloud technology described herein.

Figure 3B:
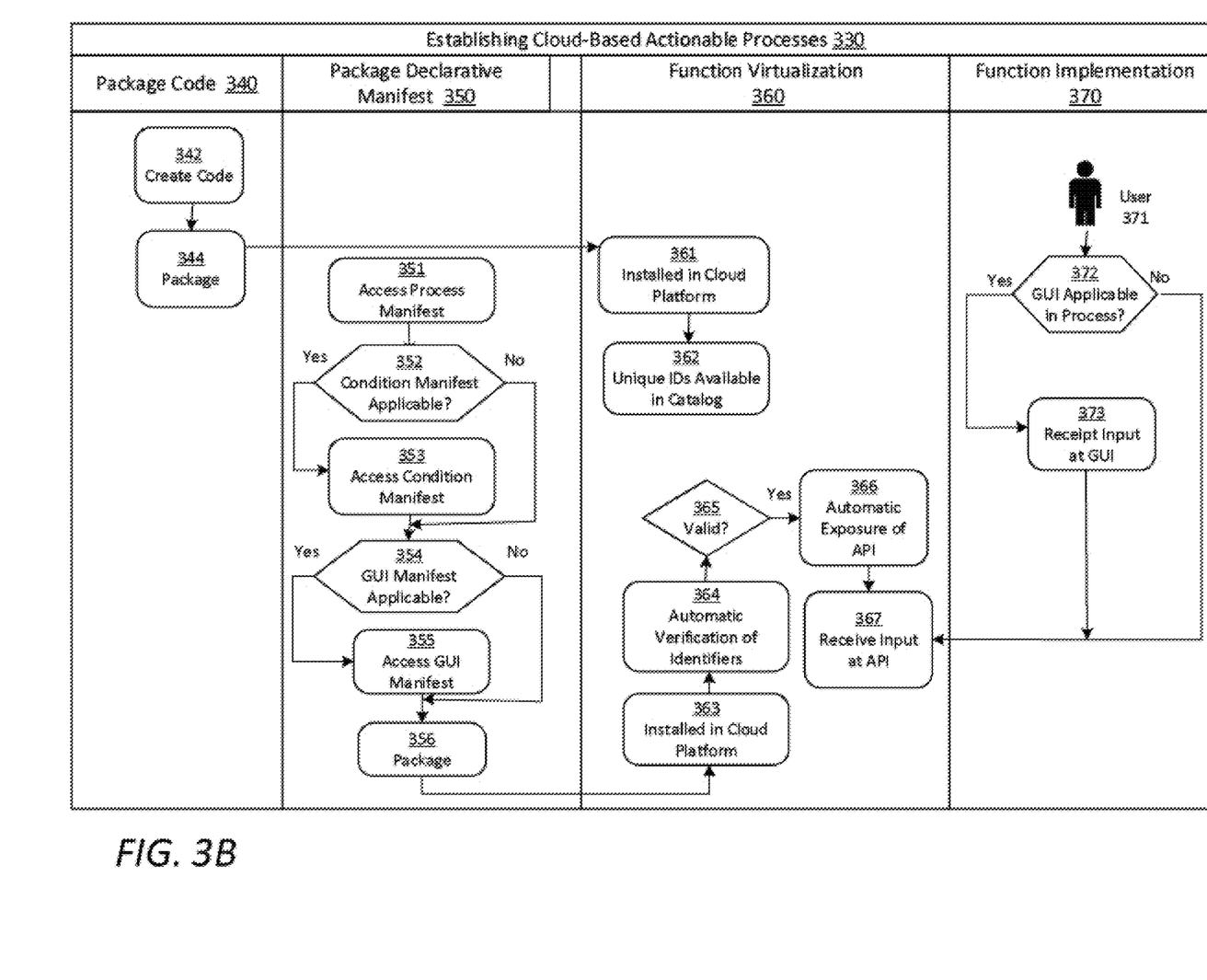
FIG. 3B illustrates a process for establishing cloud-based actionable processes according to an example.

FIG. 3B illustrates a process for establishing of cloud-based actionable processes according to an example. In the illustration, a process 330 for establishing cloud-based actionable processes includes a process for package code generation 340, a process for package declarative manifest generation 350, a process for function virtualization system 360, and a process for function implementation 370.

In the package code generation process 340, code for an application is created at block 342, the application including an application specific function. A package that includes application code and application specific functions is generated at block 344. The package is installed at block 361 on a functions virtualization system. Unique identifiers for the application are made available in a catalog at block 362, the catalog providing unique identifiers applications in a cloud environment.

The package declarative manifest generation process 350 includes accessing a process manifest 351 with regard to the application specific function included in the package generated at 344. If a condition manifest is to be applied to or used for the function (as determined at 352 based on whether the application specific function includes conditions to be virtualized, such condition manifest is accessed 353. Further, if a GUI manifest is to be applied to or used for the function (as determined at 354 based on whether the application specific function includes use of a GUI to be virtualized), such GUI manifest is accessed at 355. Based on the one or more foregoing manifests, a package for an cloud-based actionable process to enable the application specific function is generated 356, and is installed 363 in the cloud platform 363. The process proceeds with verification of identifiers for the cloud-based actionable process 364. If the verification indicates that the cloud-based actionable process is valid 365, the process is exposed by the API 366, and thus is made available without specific programming of an API for the process. Input may then be received at the API for the cloud-based actionable process 367.

In the function implementation 370, if a GUI is applicable for the cloud-based actionable process 372, input (from a user 371) may be received at an established GUI 373 in connection with the application specific function, with the operation then flowing to receipt of input the API for the cloud-based actionable process 367.

Figure 4:
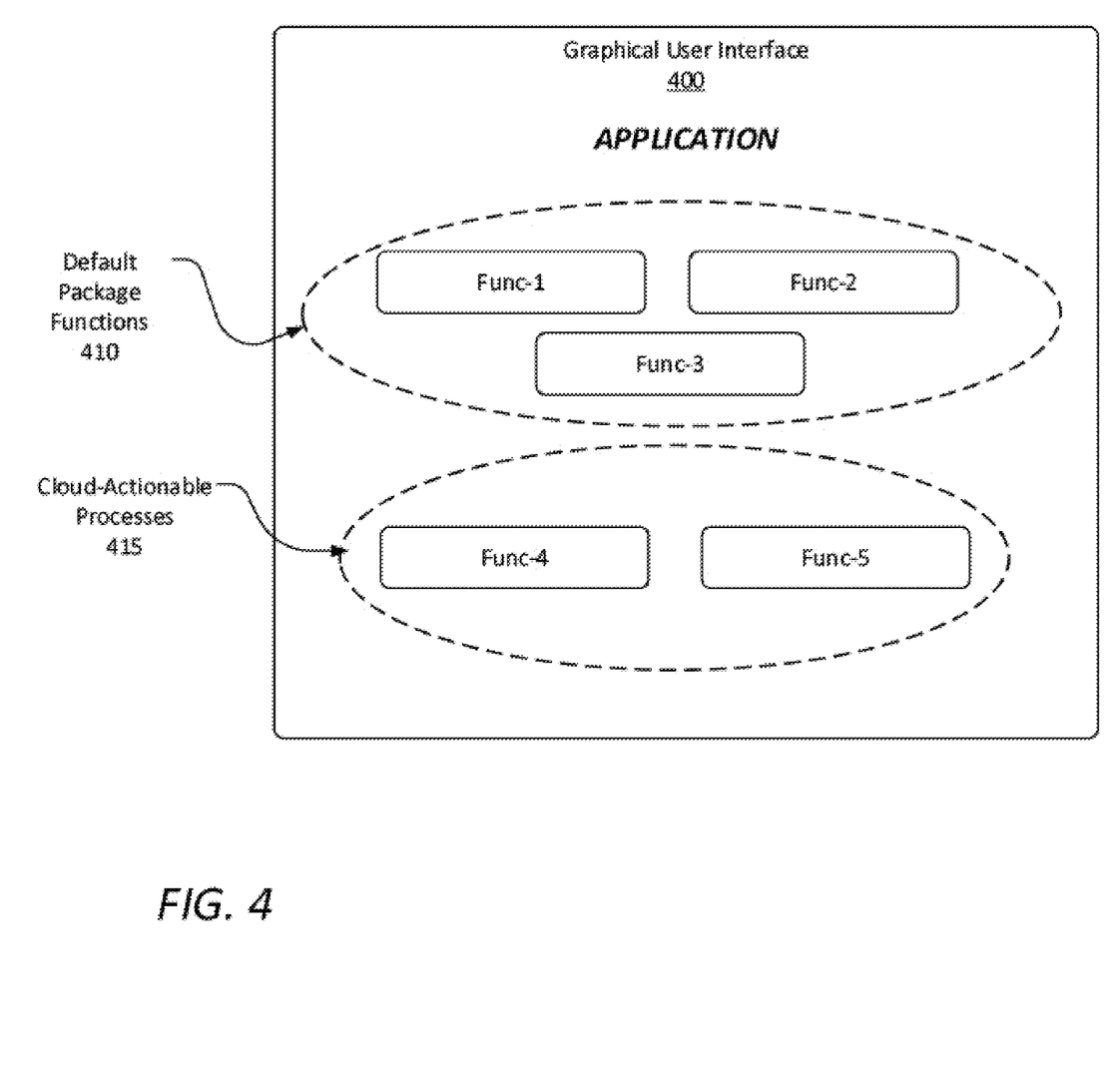
FIG. 4 is an illustration of an example of a graphical user interface to expose one or more cloud-based actionable processes.

FIG. 4 is an illustration of an example of a graphical user interface to expose one or more cloud-based actionable processes. In an example, a particular application is to be processed in a cloud environment, such as Application-A 125 or Application-B 135 in cloud environment 100 as provided in FIG. 1. The processing of the application may include exposing one or more functions in a particular GUI 400. In this illustration, the exposure of the functions may include access to one or more default package functions 410 that are available to each application and access to one or more cloud-based actionable processes 415 generated to implement the application specific functions of the particular application.

As illustrated in FIG. 4, the cloud-based actionable processes 415 may be utilized to not only abstract the API, but also to be presented in the GUI 400 in a homogenous way so that these cloud-based actionable processes can be integrated with the default or standard (i.e., out of the box) GUI without any special GUI coding being implemented. In this manner, the visualization of operations can be presented in the application package without additional GUI coding, and in general application specific functions may be exposed in a homogenous and secure way without coding into the orchestrator the definition of all actions and conditions.

In this manner, an application may operate to enrich the capabilities of the orchestrator not only with regard to the application itself but also with regard to operational functionality the application may seek to add (e.g., license management, backup, upgrade, etc.). With cloud-based actionable processes, operational functionality, visualization, and application specific conditions can be packaged along with the application software.

Figure 5:
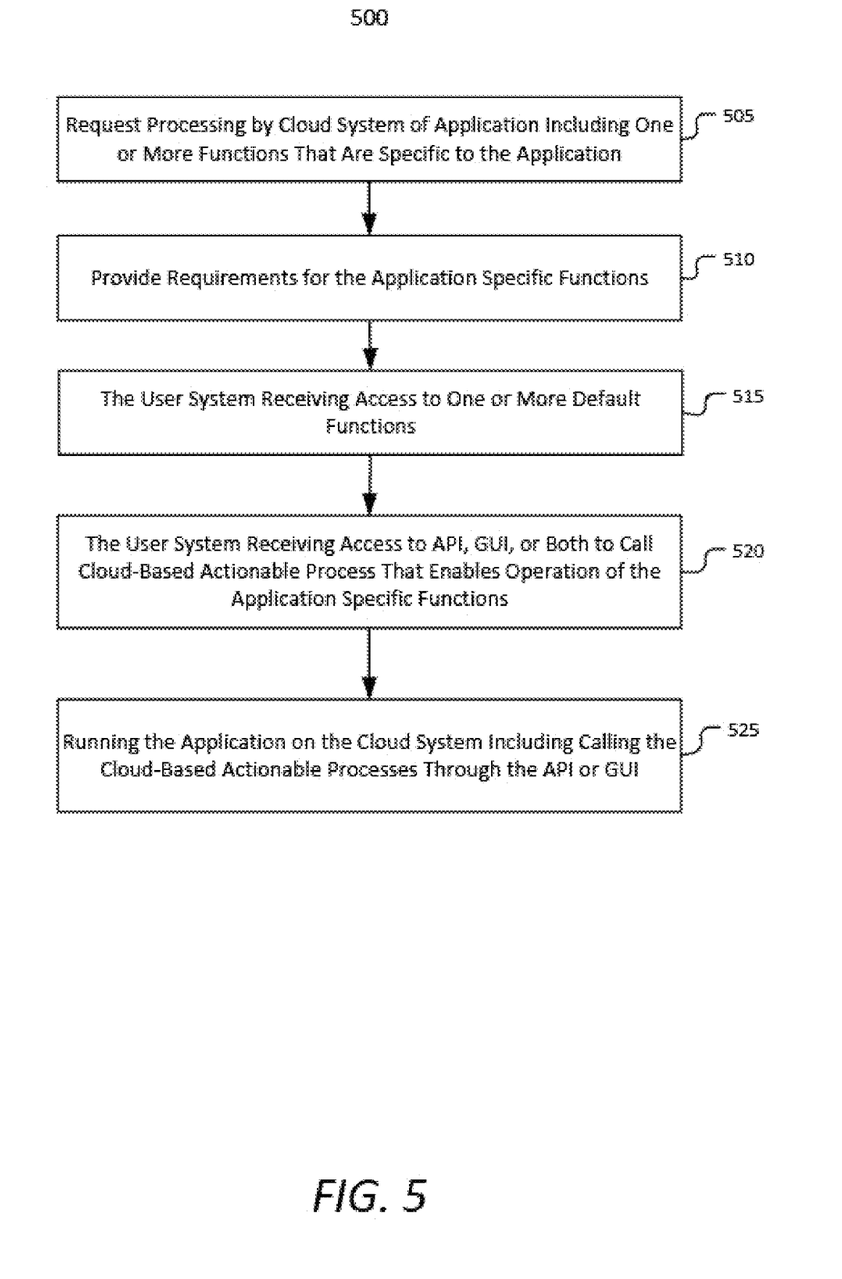
FIG. 5 provides a flowchart to illustrate a process for requesting cloud-based actionable processes, according to an example.

FIG. 5 provides a flowchart to illustrate a process for requesting cloud-based actionable processes, according to an example. In a process 500, a user system may request execution by a cloud system of an application at block 505. The application includes one or more application specific functions that are in addition to one or more default functions that may be provided by the cloud system to all cloud-based applications.

The user system may, in connection with the application, further provide certain operations, parameters, or conditions for the application specific functions at block 510. The operations, parameters, or conditions may include, but are not limited to, specification of actions to be supported for the function, conditions that are associated with the function, and visualizations associated with the function to be presented in the performance of the function. In some embodiments, the one or more application specific functions are virtualized by the cloud system through generation of a cloud-based actionable process that enables operation of the application specific functions.

The process 500 may continue with the user system receiving access to the one or more default functions at block 515 and further access to one or more APIs, GUIs, or both to call the cloud-based actionable process that enables operation of the application specific functions at block 520. For example, access may be made available to the user system after implementation of the cloud-based actionable processes in a cloud system, as will be described below with reference to FIG. 6. The user system may then proceed to run the application on the cloud system including calling the cloud-based actionable processes through the APIs or GUIs at block 525.

Figure 6:
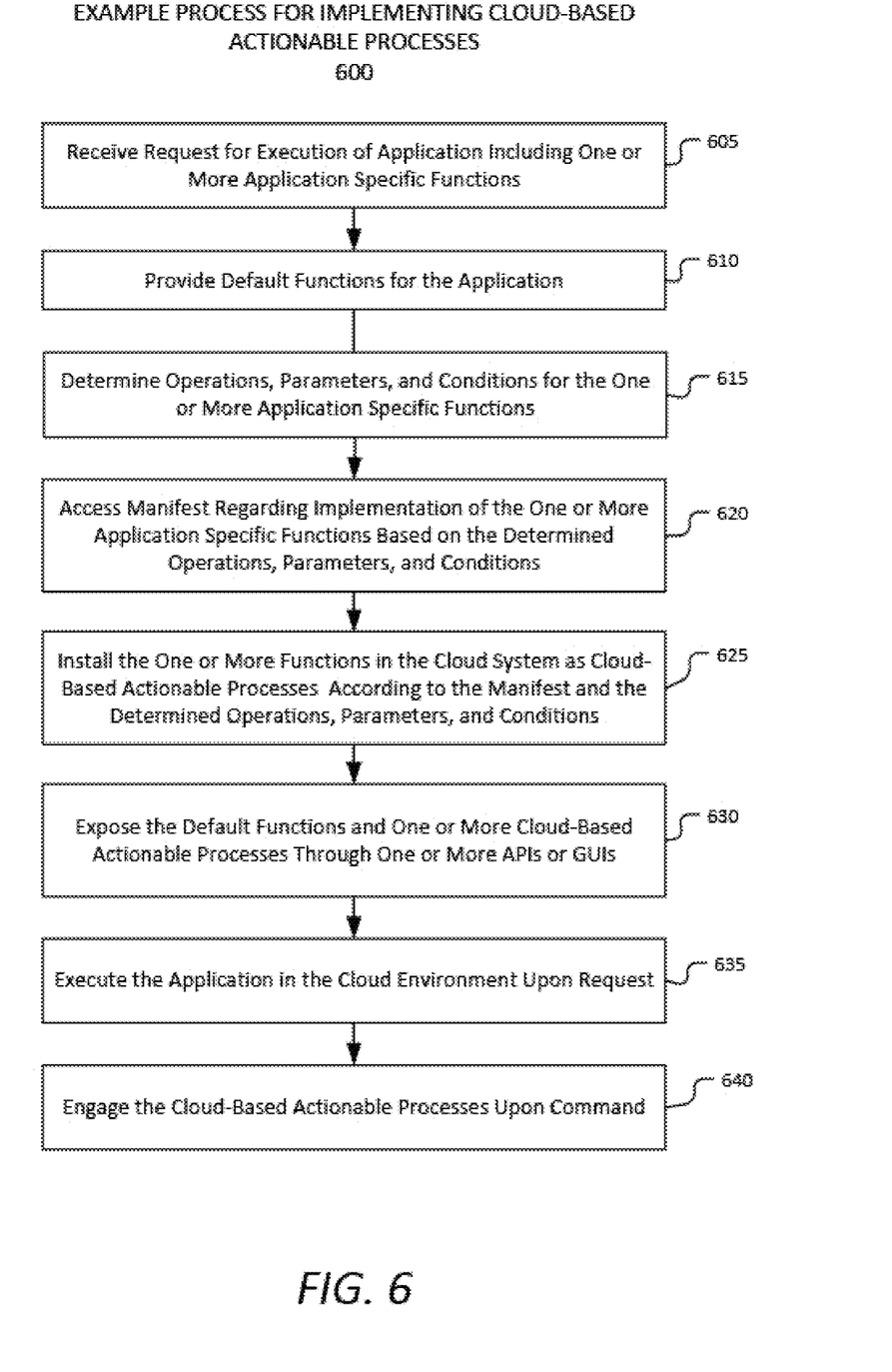
FIG. 6 provides a flowchart to illustrate a process for implementing cloud-based actionable processes, according to an example.

FIG. 6 provides a flowchart to illustrate a process for implementing cloud-based actionable processes, according to an example. An example process 600 relates to operations by a cloud system to implement cloud-based actionable processes to enable operation of certain application specific functions. The process 600 includes receiving at the cloud system a request for an application to be executed at block 605 (such as the request from a user system provided at block 505 in FIG. 5), the application including one or more application specific functions to be executed from an orchestrator in the cloud environment. The application specific functions are in addition to one or more default functions that are available from the orchestrator. The process 600 may include providing the one or more default functions for the application at block 610.

In an example, the process 600 proceeds with determining the operations, parameters, and conditions for the one or more application specific functions from the request at block 615. A package declarative manifest (main manifest) is then accessed regarding the support to be provided for implementation of the application specific function 620, wherein the manifest may include multiple manifests (sub-manifests) such as a process manifest, a condition manifest, and a GUI manifest. In some implementations, the application of the manifests may, for example, be processed as illustrated in blocks 351 to 356 of FIG. 3B.

The one or more application specific functions are installed in the cloud system as cloud-based actionable processes according to the manifest and the operations, parameters, and conditions for the application specific functions at block 625. For example, block 625 may include installation on a system (e.g., as in block 363 of FIG. 3B) and verification of identifiers for the cloud-based actionable processes (as in block 364 of FIG. 3B). The process 600 may further include exposing the default functions and the one or more cloud-based actionable processes in one or more of a graphical user interface (GUI) and an application program interface (API) at block 630, wherein the GUI and API may be generic interfaces that allow for accessing the functions in a homogeneous manner as other functions, such as the one or more default functions. The application may then be executed in the cloud environment on request at block 635, including engaging the generated cloud-based actionable processes upon command at block 640. In some examples, process 600 may also include additional or alternate blocks described above with respect to FIG. 3B.

In this manner, the application specific functions may be implemented as cloud-based actionable processes without generating and implementing significant new coding to enable the functions, and without implementing separate APIs and GUIs to expose cloud-based actionable processes in operation.

Figure 7:
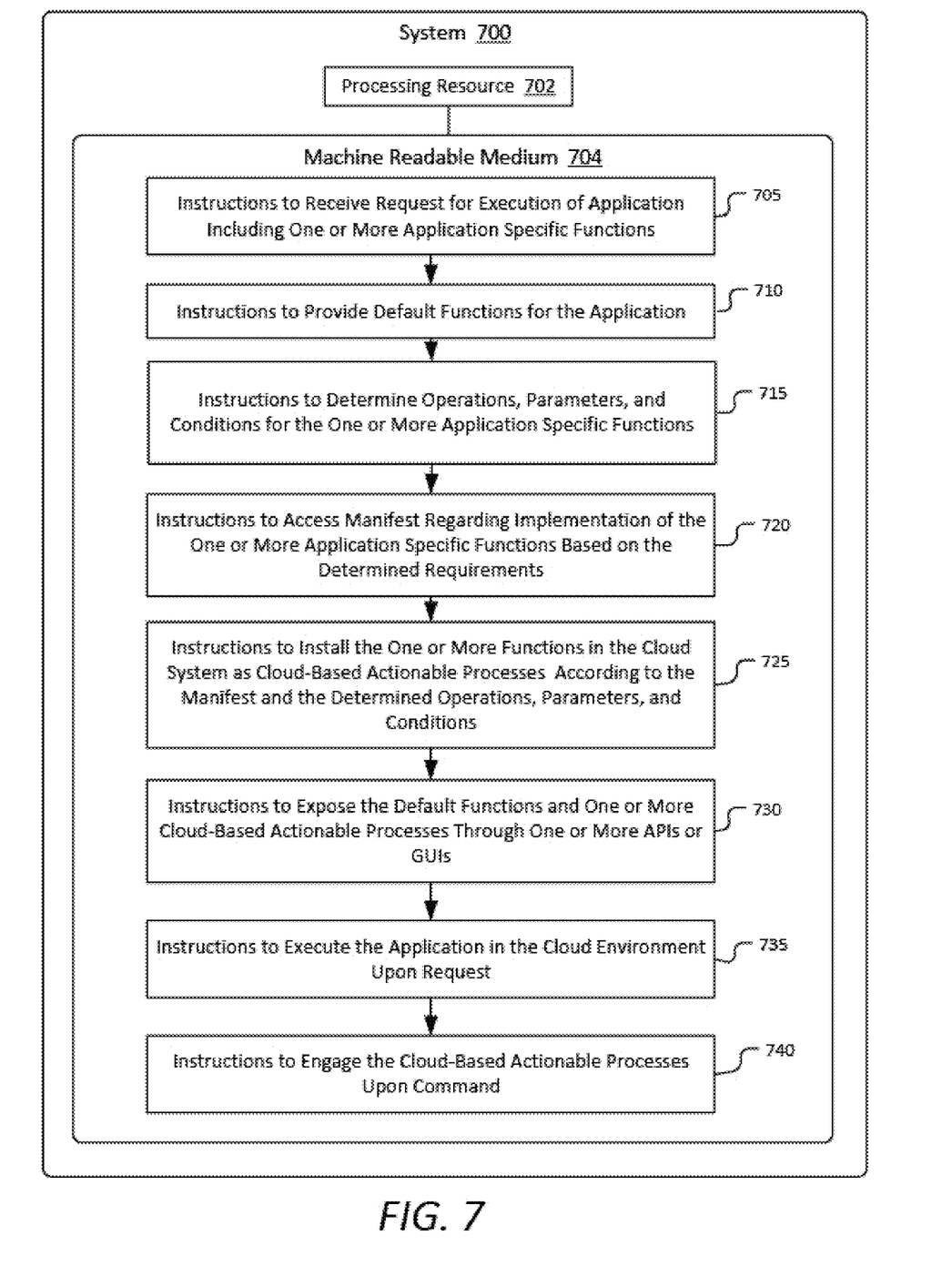
FIG. 7 depicts an example system that includes a non-transitory, machine readable medium encoded with example instructions executable by a processing resource.

FIG. 7 depicts an example system 700 that includes a non-transitory, machine readable medium 704 encoded with example instructions 705, 710, 715, 720, 725, 730, 735, and 740 (collectively referred to as instructions 705-740) executable by a processing resource 702. In some implementations, the system 700 be useful for performing process 300 of FIG. 3A, performing process 330 of FIG. 3B, performing process 500 of FIG. 5, and performing process 600 of FIG. 6.

The processing resource 702 may include a microcontroller, a microprocessor, central processing unit core(s), an ASIC (Application-Specific Integrated Circuit), an FPGA (Field-Programmable Gate Array), and/or other hardware device suitable for retrieval and/or execution of instructions from the machine readable medium 704 to perform functions related to various examples. Additionally or alternatively, the processing resource 702 may include or be coupled to electronic circuitry or dedicated logic for performing some or all of the functionality of the instructions The machine readable medium 404 may be any medium suitable for storing executable instructions, such as RAM (Random-Access Memory), ROM (Read-Only Memory), EEPROM (Electrically Erasable Programmable Read-Only Memory), flash memory, a hard disk drive, an optical disc, or the like. In some example implementations, the machine readable medium 704 may be a tangible, non-transitory medium. The machine readable medium 704 may be disposed within the system 700, in which case the executable instructions may be deemed installed or embedded on the system 700. Alternatively, the machine readable medium 704 may be a portable (e.g., external) storage medium, and may be part of an installation package.

As described further herein below, the machine readable medium 704 may be encoded with a set of executable instructions 705-740. It should be understood that part or all of the executable instructions and/or electronic circuits included within one box may, in alternate implementations, be included in a different box shown in the figures or in a different box not shown. Some implementations of the system 700 may include more or fewer instructions than are shown in FIG. 7.

Instructions 706, when executed, cause the processing resource 702 to instantiate a containerized storage virtualization system that manages data in hierarchical structures, such as hash trees. In particular, the containerized storage virtualization system maintains a deduplicated object store that stores the data objects and metadata objects referenced by virtual persistent volumes created by instructions 412 described below. In some implementations, instructions 706 may coordinate with a container orchestrator to deploy the storage virtualization system as a containerized application. In some implementations, one or more of instructions 705-740 to be described may form part of the functionality of the storage virtualization system itself.

Instructions 705, when executed, cause the processing resource 702 to receive at a cloud system a request for an application to be executed, the application including one or more application specific functions to be executed from an orchestrator in the cloud environment. The application specific functions are in addition to one or more default functions that are available from the orchestrator. Instructions 710, when executed, cause the processing resource 702 to provide the one or more default functions for the application.

Instructions 715, when executed, cause the processing resource 702 to determine the operations, parameters, and conditions for the one or more application specific functions from the request. Instructions 720, when executed, cause the processing resource 702 to access a package declarative manifest (main manifest) regarding the support to be provided for implementation of the application specific function, wherein the manifest may include multiple manifests (sub-manifests) such as a process manifest, a condition manifest, and a GUI manifest.

Instructions 725, when executed, cause the processing resource 702 to install the one or more application specific functions in the cloud system as cloud-based actionable processes according to the manifest and the operations, parameters, and conditions for the application specific functions. Instructions 730, when executed, cause the processing resource 702 to expose the default functions and the one or more cloud-based actionable processes in one or more of a GUI and an API, wherein the GUI and API may be generic interfaces that allow for accessing the functions in a homogeneous manner as other functions, such as the one or more default functions.

Instructions 735, when executed, cause the processing resource 702 to execute the application in the cloud environment on request. Instructions 740, when executed, cause the processing resource 702 to engage the generated cloud-based actionable processes upon command.

The following clauses and/or examples pertain to further examples. Specifics in the examples may be applied anywhere in one or more examples. The various features of the different examples may be variously combined with certain features included and others excluded to suit a variety of different applications. Examples may include subject matter such as a method, means for performing acts of the method, at least one machine-readable medium, such as a non-transitory machine-readable medium, including instructions that, when performed by a machine, cause the machine to perform acts of the method, or of an apparatus or system for facilitating operations according to examples described herein.

In the description above, for the purposes of explanation, numerous specific details are set forth in order to provide a thorough understanding of the described examples. It will be apparent, however, to one skilled in the art that examples may be practiced without some of these specific details. In other instances, well-known structures and devices are shown in block diagram form. There may be intermediate structure between illustrated components. The components described or illustrated herein may have additional inputs or outputs that are not illustrated or described.

Various examples may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

In an example, a non-transitory computer-readable storage medium has stored thereon executable computer program instructions that, when executed by a processor, cause the processor to receive a request for an application to be executed in a cloud environment, the application including an application specific function to be executed from an orchestrator in the cloud environment, the application specific function being in addition to a default function that is available from the orchestrator; define the application specific function as a cloud-based actionable process based at least in part on a package declarative manifest; and expose the defined cloud-based actionable process in one or more of a graphical user interface (GUI) or an application program interface (API).

In an example, a computing system includes a processor; and a memory storing instructions that, when executed by the processor, cause the processor to receive a request for an application to be run in a cloud environment, the application including an application specific function to be executed from an orchestrator in the cloud environment, the application specific function being in addition to a default function that is available from the orchestrator; define the application specific function as a cloud-based actionable process based at least in part on a package declarative manifest; and expose the defined cloud-based actionable process in one or more of a graphical user interface (GUI) or an application program interface (API).

In an example, a method includes receiving a request for an application to be run in a cloud environment, the application including an application specific function to be executed from an orchestrator in the cloud environment, the application specific function being in addition to a default function that is available from the orchestrator; defining the application specific function as a cloud-based actionable process based at least in part on a package declarative manifest; and exposing the defined cloud-based actionable process in one or more of a graphical user interface (GUI) or an application program interface (API).

Portions of various examples may be provided as a computer program product, which may include a computer-readable medium having stored thereon computer program instructions, which may be used to program a computer (or other electronic devices) for execution by one or more processors to perform a process according to certain examples. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, examples may also be downloaded as a computer program product, wherein the program may be transferred from a remote computer to a requesting computer. In some examples, a non-transitory computer-readable storage medium has stored thereon data representing sequences of instructions that, when executed by a processor, cause the processor to perform certain operations.

Processes can be added to or deleted from any of the methods described above and information can be added or subtracted from any of the described messages without departing from the basic scope of the present examples. It will be apparent to those skilled in the art that many further modifications and adaptations can be made. The particular examples are not provided to limit the concept but to illustrate it. The scope of the examples is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

What is claimed is:

1. A non-transitory computer-readable storage medium having stored thereon executable computer program instructions that, when executed by a processor, cause the processor to:
   receive a request for an application to be executed in a cloud environment,
   wherein:
      the application includes an application specific function to be executed from an orchestrator in the cloud environment,
      the application specific function is in addition to a default function that is available from the orchestrator, and
      the request includes one or more conditions related to restricting availability of the application specific function;
   define the application specific function as a cloud-based actionable process based at least in part on a package declarative manifest,
   wherein:
      the package declarative manifest indicates support to define the application specific function in relation to the cloud-based actionable process through an indication of support for implementing the application specific function, and
      the package declarative manifest comprises a condition manifest comprising the one or more conditions; and
   expose the cloud-based actionable process in a graphical user interface (GUI) or an application program interface (API).

2. The non-transitory computer-readable storage medium of claim 1, wherein:
   the request further includes one or more operations or parameters for the cloud-based actionable process, and
   defining the cloud-based actionable process is further based on the one or more operations or parameters.

3. The non-transitory computer-readable storage medium of claim 2, wherein the one or more operations or parameters include one or more of:
   actions for the cloud-based actionable process; or
   visualization for the cloud-based actionable process.

4. The non-transitory computer-readable storage medium of claim 1, wherein the package declarative manifest further includes one or more of:
   a process manifest regarding processes to trigger the cloud-based actionable process; or
   a GUI manifest regarding the GUI for access to the cloud-based actionable process.

5. The non-transitory computer-readable storage medium of claim 1, wherein the GUI or API is also utilized for the default function.

6. The non-transitory computer-readable storage medium of claim 1, wherein the cloud-based actionable process is treated in a same manner as other orchestration actions supported by the orchestrator.

7. The non-transitory computer-readable storage medium of claim 1, wherein the application specific function includes one or more of:
a license function for the application;
a backup function for the application; or
an upgrade function for the application.

8. A computing system comprising:
a processor; and
a memory storing instructions that, when executed by the processor, cause the processor to:
receive a request for an application to be run in a cloud environment,
wherein:
the application includes an application specific function to be executed from an orchestrator in the cloud environment,
the application specific function is in addition to a default function that is available from the orchestrator, and
the request includes one or more conditions related to restricting availability of the application specific function;
define the application specific function as a cloud-based actionable process based at least in part on a package declarative manifest,
wherein:
the package declarative manifest indicates support to define the application specific function in relation to the cloud-based actionable process through an indication of support for implementing the application specific function, and
the package declarative manifest comprises a condition manifest comprising the one or more conditions; and
expose the cloud-based actionable process in a graphical user interface (GUI) or an application program interface (API).

9. The computing system of claim 8, wherein:
the request further includes one or more operations or parameters for the application specific function, and
defining the cloud-based actionable process is further based on the one or more operations or parameters.

10. The computing system of claim 9, wherein the one or more operations or parameters include one or more of:
actions for the application specific function;
or
visualization for the application specific function.

11. The computing system of claim 8, wherein the package declarative manifest further includes one or more of:
a process manifest regarding processes to trigger the application specific function; or
a GUI manifest regarding the GUI for access to the application specific function.

12. The computing system of claim 8, wherein the GUI or API is also utilized for the default function.

13. A method comprising:
receiving a request for an application to be run in a cloud environment,
wherein:
the application includes an application specific function to be executed from an orchestrator in the cloud environment,
the application specific function is in addition to a default function that is available from the orchestrator, and
the request includes one or more conditions related to restricting availability of the application specific function;
defining the application specific function as a cloud-based actionable process based at least in part on a package declarative manifest,
wherein:
the package declarative manifest indicating support to define the application specific function in relation to the cloud-based actionable process through an indication of support for implementing the application specific function, and
the package declarative manifest comprises a condition manifest comprising the one or more conditions; and
exposing the application specific function in one or more of a graphical user interface (GUI) or an application program interface (API).

14. The method of claim 13, wherein:
the request further includes one or more operations or parameters for the application specific function, and
defining the application specific function is further based on the one or more operations or parameters.

15. The method of claim 14, wherein the one or more operations or parameters conditions include one or more of:
actions for the application specific function;
or
visualization for the application specific function.

16. The method of claim 13, wherein the package declarative manifest includes one or more of:
a process manifest regarding processes to trigger the application specific function; or
a GUI manifest regarding the GUI for access to the application specific function.

17. The method of claim 13, wherein the GUI or API is also utilized for the default function.

* * * * *